Patented Mar. 17, 1953

2,632,012

UNITED STATES PATENT OFFICE 2,632,012

PROCESS FOR SEPARATING OIL-SOLUBLE SUBSTANCES

Jan Boldingh, Rotterdam, Netherlands, assignor to Lever Brothers Company, Cambridge, Mass., a corporation of Maine No Drawing. Application March 27, 1948, Serial No. 17,573. In the Netherlands April 1, 1947

19 Claims. (Cl. 260—419)

The present invention relates to a process for separating oil-soluble substances.

Certain naturally occurring glyceride oils contain valuable substances as part of the unsaponifiable fraction thereof, and it is desirable to be able to separate such substances in a pure state, or at least in a state containing a smaller proportion of other unsaponifiable matter than in the naturally occurring oil itself. An example is the separation of carotene from red palm oil in which it occurs and from the accompanying xanthophyll.

Naturally occurring glyceride oils are mixtures of the glycerides of different high molecular weight fatty acids. The various fatty acids have different useful properties owing to their different molecular weight and/or degree of unsaturation, and it is desirable to be able to separate such mixtures of glyceride oils, or the fatty acids derived from them, so that different fractions may be used for different purposes.

In other cases it may be desirable to achieve a concentration of an oil-solution of an oil-soluble substance, for instance carotene, as the more highly concentrated solutions are more valuable than the dilute solutions.

The invention applies to mineral oils as well as glyceride oils.

It is an object of the present invention to achieve such separations or concentrations.

Further objects of the present invention will appear from the following description.

It has been found that solids, mostly high-molecular substances, which may be purely organic or which may contain inorganic constituents such as silicones, are capable of preferentially absorbing certain materials, or of allowing certain substances to become dispersed therein. This is in contradistinction to the well-known preferential adsorption exhibited for example by alumina, which is a surface effect.

The present invention consists in a process for the separation of oil-soluble substances which comprises treating a solution of the substance with a finely divided or pulverised solid having the property that the substance to be separated becomes dispersed therein. The substance to be separated can be obtained by washing the finely divided substance with a solvent. The solid may be one in which the said substance itself becomes easily dispersed. Alternatively there may be used a solid which has absorbed in it an oil or a liquid which is miscible with oil.

In selecting the solid consideration must be had to the nature of the substance to be separated and to the nature of the liquids being used, in relation to the solid. The choice will be guided by the consideration that those solids are particularly suitable which show a certain relationship with the substance to be separated, for example as regards their chemical character, lipophilic property and the like. In the case where the solid is one which has absorbed an oil or an oil-miscible liquid, the substance to be separated must be capable of being dispersed in the solid so modified, and what has been said regarding the relationship of the substance to be separated and the unmodified solid also applies.

To obtain or remove the separated oil-soluble substance from the solid there is preferably used a solvent which is a liquid miscible with oil and which has the property of being taken up by the solid. It is preferable that the finely divided solid is so chosen that it has a limited capacity for absorbing the solvent and does not noticeably dissolve in an excess of it. Thus the separated substance can easily be obtained by washing the solid with the proper solvent.

A very suitable solid for the present purpose is finely divided rubber. Rubber here means not only natural rubber, but also rubber-like products such as guttapercha, synthetic rubber and similar substances. As is well known, the solubility of rubber in organic solvents decreases the higher the degree of vulcanisation. It is thus possible to choose the rubber to be used in such a way that it suits the requirements set out above in regard to its absorptive capacity for oil or liquids miscible with oil.

It has been found that rubber can easily be finely divided by cutting it into small pieces and then treating the pieces with oil or a liquid miscible with oil, for instance petrol ether. The pieces swell up and are then ground in the presence of an excess of the oil or liquid. This may be done, for example, in a ball mill. It has appeared that rubber modified in this way loses its elasticity and toughness to such an extent that it is easy to grind.

The oil-soluble substance to be separated may be brought in contact with the solid in the form of a solution in a liquid having no or limited miscibility with oil. The choice of this liqiud naturally depends upon the nature of the substance to be separated. The invention is particularly useful for the separation of carotene from carotene-bearing liquids which, for instance, can be obtained from highly coloured palm oil. Particularly soap solutions may be cited as examples of liquids having no or limited miscibility with oil, from which carotene can be obtained as more particularly described below. For preference soap solutions are used in which one or more water-soluble hydroxy or polyhydroxy compounds, for example an alcohol, are dissolved; very good results are obtained, for instance, with aqueous alcoholic soap solutions. The use of purely aqueous soap soltuions gives far less satisfactory separation. Alternatively, a solution of the substance to be separated in an oil or in an oil-miscible solvent may be used. In either case the liquid and the finely divided solid form a two-phase system in which there is a partition of the oil-soluble substance selective enough to effect its extraction and separation from the solution and from other substances which may likewise be absorbed.

To bring the solution of the substance to be separated in contact with the finely divided solid, various well-known methods can be used.

In the simplest method, which gives good results in practice, the solution of the substance is stirred with the pulverised solid and the solid is separated by settling, filtration or centrifuging. The separated solid is then washed with a solvent miscible or having limited miscibility with oil or consecutively with two or more such solvents for the desired substance; in this way the substance can be extracted and separated.

Alternatively the solid may be used in the form of a column through which the solution of the substance to be separated is run. After the desired quantity of the substance has been absorbed, it is separated by extracting the column with a solvent for the substance to be separated. In the case where a separation from other substances also taken up by the solid from the original solution is desired, the well known chromatographic methods can be used. These substances will, in general, accumulate in particular zones of the column. A separation can then be brought about by dividing the column into pieces and extracting them separately, or by extracting the column in its entirety or after division with different solvents in succession.

Carotene is mentioned above only as an example. Other oil-soluble substances can also be separated in the manner described; for instance fatty acid mixtures and glyceride oils may be separated into fractions of differing compositions.

The invention will be illustrated by the following examples:

*Example I*

9.22 grams of dark red palm oil were saponified with 40 cc. methylated ethanol and 4 grams potassium hydroxide. Then the soap solution was diluted with alcohol and water to 100 cc. so that the solution contained 50% alcohol by volume, and was then saturated with petroleum ether. This solution was shaken with 5 grams of rubber powder. The rubber immediately became bright yellow. After one hour the rubber was filtered off and washed with 50% alcohol until it was free of soap.

The soap solution filtrate was extracted with ether. This gave a mixture of carotene and other yellow pigments which will be conveniently described as xanthophylls.

The rubber was rinsed on the filter with alcohol and then with ether. The yellow substances which had been absorbed were partly extracted with the alcohol and rapidly and completely with the ether.

Analysis showed the following:

9.22 grams of the original oil contained
6.82 mg. of carotene and
2.85 mg. of xanthophylls (calculated by assuming equal colour absorption for carotene and xanthophyll per unit of weight).

The extract from the rubber contained:

5.83 mg. of carotene and
0.99 mg. of xanthophyll.

The extract from the soap solution contained:

0.99 mg. carotene and
1.29 mg. xanthophyll.

The rubber accordingly contained 85.5% of the total quantity of carotene while the ratio of carotene : xanthophylls was about 85.5 : 14.5.

In the soap solution only 14.5% of the carotene was left. The ratio carotene : xanthophyll in the ether extract from the soap solution was 43.4 : 56.6. In the soap solution itself this ratio was still lower as part of the xanthophylls were retained in the soap solution on extraction.

From this it appears that besides obtaining carotene from soap by this method the ratio carotene : xanthophyll simultaneously improves considerably in favour of the carotene.

*Example II*

21.4 grams of pulverised rubber were shaken with ethanol of 50%, to which 40 cc. petroleum ether had been added. This was taken up by the rubber causing it to swell considerably. After removing the air bubbles under reduced pressure this suspension was put in a tube of 5 cm. diameter which narrowed at the bottom and was fitted with a cotton-wool wad. When the liquid in equilibrium with the rubber had run out the rubber slowly sank to a compact column, at the top of which was placed a well-fitting filter-paper and which was then carefully pressed down. The final length of the column was about 15 cm. Then 400 cc. of a soap solution saturated with petroleum ether was prepared according to Example I from 40 grams of red palm oil and filtered through the column. The top of the column acquired a strong reddish-yellow colour, while the soap which ran through had a brownish-yellow tint.

The column was then washed with further quantities of 50% ethanol until the liquid running out did not react with phenolphthalein, for which 250 cc. were necessary.

The column was then removed from the tube and divided into three pieces *a*, *b* and *c* (counting from the top downwards).

These pieces and the soap solution were analysed, with the following result:

|  | Mg. | Ratio, carotene:xanthophylls |
|---|---|---|
| Total quantity of carotene in palm oil | 29.8 | 71:29 |
| Total quantity of xanthophylls in palm oil | 12.2 | |
| Piece *a*: | | |
| carotene | 13.25 | 87:13 |
| xanthophylls | 2.0 | |
| Piece *b*: | | |
| carotene | 11.25 | 86.5:13.5 |
| xanthophylls | 1.75 | |
| Piece *c*: | | |
| carotene | 5 | 72.5:27.5 |
| xanthophylls | 1.9 | |
| Soap solution: | | |
| carotene | none | |
| xanthophylls | 3.65 | |
| Recovered: | | |
| carotene, in total | 29.5 | |
| xanthophylls, in total | 9.3 | |

In this example the soap solution was extracted with ether three times, but still contained a proportion of a yellow xanthophyll-like substance. The substance extracted with ether gave a strong Carr-Price reaction.

The capacity of the rubber for absorbing carotene can be shown by drying the rubber from parts a, b and c in a vacuum after removal of the substances retained and then weighing. The weights of the three pieces were

|  | Grams |
|---|---|
| Piece a | 2.55 |
| Piece b | 2.84 |
| Piece c | 16.0 | a and b thus have a combined weight of only 5.4 grams; they contain, however 24.5 mg., that is 83% of the total quantity of the carotene.

If the unsaponifiable part of palm oil dissolved in petroleum ether is chromatographed using alumina ($Al_2O_3$), many coloured rings and several uncoloured but yellow or white fluorescent rings are formed. Carotene prepared by the process of the present invention, however, yields, with the same chromatographic treatment, only one zone of an admixed xanthophyll, while in ultra-violet light no uncoloured fluorescent substances are to be traced.

Example III

The above experiment was repeated using rubber which had not first been allowed to swell in petroleum ether and with a soap solution not saturated with petroleum ether. In this case too a very sharp reddish-orange coloured zone appeared when the palm oil soap solution was passed through the column. Thus the rubber as such without treatment also has the property of retaining carotene.

Example IV

A column was made from rubber powder which had absorbed petroleum ether in the manner described in Example II.

Several milligrams of a mixture of lauric acid and palmitic acid dissolved in 50% alcohol were carefully brought on the column. It was then carefully washed with dilute alcohol in which a suitable indicator, methyl red for example, had been dissolved. For the first washings 50% alcohol which had been saturated with petroleum ether was used and both acids remained in the top of the column. Then 80% alcohol saturated with petroleum ether was used, when the acids separated and gave two coloured bands in the column. The lauric acid zone was found to move quicker than the palmitic acid band. In this way, therefore, a separation of fatty acid mixtures is possible. The separation was confirmed by separate extraction of the zones and a determination of the melting points of the fatty acid fractions obtained, which gave melting points of 40° and 60° C. (lauric acid melting point 43.6° C., palmitic acid 62.9° C.).

The rubber powder used in the above examples was prepared by swelling "Mealorub B 24," a lightly vulcanised coarse rubber powder, the largest particles of which have a diameter of 0.5–1 mm. with petroleum ether and grinding it with a slight excess of petroleum ether in an hermetically sealed ball mill. The fine mash formed was drained on a Büchner filter and the petroleum ether was removed by washing with 96% ethanol, causing the rubber particles to shrink and to form a fine loose powder which remained suspended in the ethanol. With air-drying the powder was transformed into a consistent spongy mass.

As has been shown in the preceding examples, oil-soluble substances readily absorbed by rubber can be obtained simply by bringing a solution of the substance in the liquid immiscible, or only partly miscible with oil, into contact with this mass; in some cases a separate filtration is even superfluous. For the preparation of a column, however, the rubber particles should be loosened by previous swelling in a solvent miscible with oil. After forming the column this solvent can be replaced by alcohol or acetone, and the latter subsequently replaced by the liquid, for instance dilute alcohol or alcoholic soap solution, which is used as a solvent for the substance to be separated and will be fed as the mobile phase on to the column.

Example V

2½ grams strong red palm oil were dissolved in a mixture of 50 cc. 96% ethanol and 50 cc. petroleum ether (boiling point 40–60° C.). The liquid was shaken for an hour with 10 grams of rubber powder which swelled considerably. The filtrate still contained 1.39 grams of fat. The analysis gave:

a. In the original palm oil—
  Carotene _____ mg./g__ 0.74
  Xanthophyll _____ mg./g__ 0.31
  Ratio carotene : xanthophyll_____ 71:29
b. In the fat from the filtrate—
  Carotene _____ mg./g__ 0.45
  Xanthophyll _____ mg./g__ 0.31
  Ratio carotene : xanthophyll_____ 59:41

The carotene content of the fat in the filtrate had thus fallen from 0.74 mg./g. to 0.45 mg./g. which signifies a corresponding increase in the carotene content of the fat in the phase retained by the rubber. The xanthophyll content remained unchanged.

CAROTENE AND XANTHOPHYLL IN MG. PER G. FAT

|  | In the original palm oil | In the rubber phase |
|---|---|---|
| Carotene | 0.74 | 1.10 |
| Xanthophyll | 0.31 | 0.31 |
| Carotene : Xanthophyll | 71:29 | 78:22 |

After shaking the filtrate was unsaturated with oil, so that no oil had been able to precipitate on the rubber particles by oversaturation.

Example VI 10 grams palm oil, containing:

345 micrograms carotene
80 micrograms xanthophyll
6.7% fatty acid was dissolved in 30 cc. isobutanol and conducted through a column of 50 grams rubber powder which was soaked in isobutanol, after which 750 cc. isobutanol was used for washing. The filtrate was collected in 50 cc. fractions composed as follows:

| Fraction | Free fatty acid as percent of palm oil | Free fatty acid as percent of each fraction | Weight of fraction as percent of the palm oil |
|---|---|---|---|
| 1 | 0.1 | 10 | 1.0 |
| 2 | 2.8 | 44 | 6.6 |
| 3 | 3.1 | 43 | 7.3 |
| 4 | 0.6 | 6.7 | 9.0 |
| 5 | 0.1 | 1.1 | 13.0 |
| 6 | 0.0 | 0.0 | 13.2 |
| 7 |  |  | 11.6 |
| 8 |  |  | 9.5 |
| 9 |  |  | 7.5 |
| 10 |  |  | 6.0 |
|  | 6.7 |  | 84.7 |

First the free fatty acid leaves the column, mixed with other substances, primarily diglycerides. Only when the free fatty acid has been removed does the residual weight of the 50 cc. fractions attain a maximum. The fractions 1-8 inclusive contain no carotene. Starting from fraction 9 the carotene content began to rise slowly. After the column had been rinsed with 750 cc. isobutanol, 92% of the oil was removed from the column. The remaining 8% was won by rinsing with petroleum ether and contained 2480 micrograms of carotene, representing 73% of the total quantity of carotene in the palm oil. The ratio of carotene : xanthophylls in this concentrate was 91.5 : 8.5 compared with 81 : 19 in the original oil.

It is also possible to obtain the concentrate from the column with warm isobutanol or with solvent such as acetone, in which rubber does not swell, in order to prepare the column for re-use.

The example shows that without loss or chemical conversion of the oil a concentrate can be won from palm oil with eight times the content of carotene and a more favourable ratio of carotene compared with xanthophyll, while the free fatty acids and the di-glycerides can be extracted simultaneously in a pre-fraction.

*Example VII*

20 grams of the same palm oil as used in Example VI was dissolved in 20 cc. petroleum ether boiling point 40–60° C., and conducted through a column of 100 grams of rubber powder swollen in petroleum ether.

After a first wash with 500 cc. petrol ether (not collected), the next fraction of 600 cc. was collected. Further washes contained no more yellow colour. The 600 cc. fraction contained 1.04 grams of oil with 219.0 micrograms of carotene, that is 32.5% of the quantity in the original palm oil while the carotene concentration was 6 times as high as in the original material. The column remained suitable for re-use.

This example shows that liquids which swell rubber greatly may also be used as the mobile phase.

*Example VIII*

About 10 grams soya bean oil dissolved in acetone were conducted through a 35 cm. long by 3.6 cm. diameter rubber column, after which acetone was used for rinsing. The filtrate was collected in portions as follows:

|   | volume in cc. | weight of the fraction residue in gr. | Iodine value |
|---|---|---|---|
| 1 | 100 | 0.80 | 153.1 |
| 2 | 100 | 3.37 | 150.4 |
| 3 | 100 | 3.17 | 122.9 |
| 4 | 400 | 2.72 | 92.2 |
|   |     | 10.06 | [1] 126.0 |

[1] Average.

The original oil had an iodine value of 125.3. In this way, therefore, soya oil can be separated into more and less unsaturated fractions, which can be used for greatly varying purposes; the more highly unsaturated fraction, for example, can be used in the paint industry as a material for quick drying oils. The less unsaturated part is more suitable than the original soya bean oil as an edible oil or as material for an edible oil or fat.

*Example IX*

3 grams of a mixture of approximately equal quantities of oleic acid and linoleic acid were dissolved in 5 cc. 80% ethanol and conducted through a column of rubber powder, which was then washed with 80% ethanol. The following fractions were collected:

| Fraction | Volume, cc. | Weight of the fraction residue, g. | $n_D^{65}$ | Linoleic acid : oleic acid (approx.) |
|---|---|---|---|---|
| 1 | 100 | 1.307 | 1.4522 | 70:30 |
| 2 | 120 | 1.374 | 1.4486 | 36:64 |
| 3 | 120 | 0.197 | 1.4472 |  |

The refractive index of the original fatty acid was 1.4501.

This example shows that the linoleic acid accumulates in the first fraction, while the oleic acid is more strongly retained. In the preparation of drying oils for the paint industry it is important to remove fatty acid radicals with only one double bond; on the other hand highly unsaturated acids are undesirable in edible oils.

I claim:

1. A process for the separation of a substance soluble in glyceride oils from a liquid mixture containing said substance, which process comprises contacting said mixture with a finely divided solid rubber substantially insoluble in said mixture and in which said substance is dispersible, whereby there is formed a solid phase containing absorbed substance and a liquid phase, separating the solid phase and recovering the absorbed substance therefrom.

2. The process of claim 1 wherein the rubber is natural rubber and an organic oil-soluble substance is separated from the liquid mixture.

3. The process of claim 1 wherein the rubber is pretreated by swelling with a solvent for oil and grinding.

4. The process of claim 1 wherein the absorbed substance is recovered from the rubber by treatment with a solvent for said substance.

5. The process of claim 1 applied to a solution of an oil-soluble substance in a liquid having limited miscibility with oil.

6. The process of claim 5 wherein the absorbed substance is recovered from the rubber by treatment with a solvent for said substance.

7. The process of claim 6 applied to a solution of a saponified glyceride oil in a water-soluble hydroxy compound to separate one component thereof.

8. The process of claim 1 wherein the finely divided rubber is formed into a column, and the liquid mixture to be separated is passed therethrough.

9. The process of claim 8 wherein the rubber is pretreated by swelling with a solvent for oil and grinding.

10. The process for the separation of a mixture of fatty acids which comprises passing said mixture through a column of finely divided natural rubber whereby a portion of said acids is absorbed in said rubber, separating the enriched rubber and recovering the absorbed substances therefrom.

11. The process for the separation of the more saturated from the less saturated glycerides of a glyceride oil which comprises passing said glyceride oil through a column of finely divided natural rubber whereby said rubber is enriched with an absorbed glyceride, separating the enriched rubber and recovering the absorbed glycerides therefrom.

12. The process of increasing the ratio of carotene : xanthophyll in the unsaponifiable portion of palm oil which comprises passing a mixture containing carotene and xanthophyll through a column of finely divided natural rubber whereby said rubber is enriched with absorbed substances from said mixture, separating the enriched rubber and recovering the absorbed substances therefrom.

13. The process of claim 1 wherein a rubber is contacted with the liquid mixture by agitation of a suspension of the rubber in said mixture.

14. The process of claim 13 wherein the absorbed substance is recovered from the rubber by treatment with a solvent for said substance.

15. A process for the separation of the unsaponifiable components of a glyceride oil comprising saponifying said oil, forming an aqueous solution of the products of the saponification and a water-soluble hydroxy compound, contacting said solution with finely divided rubber, separating the rubber from the solution and extracting a preferentially absorbed unsaponifiable substance therefrom.

16. A process for the separation of carotene comprising saponifying palm oil, contacting the saponified palm oil in alcoholic solution saturated with petroleum ether with finely divided rubber, separating the rubber from the solvent and extracting absorbed carotene from the rubber by means of a solvent therefor.

17. A process for the separation from liquid solution of a substance soluble in glyceride oils and dispersible in rubber, which comprises contacting said solution with finely divided solid rubber substantially insoluble in said solution and treated with a liquid selected from the group consisting of oil and oil-miscible liquids, whereby there is formed a solid phase containing said glyceride oil-soluble substance absorbed in said liquid-treated rubber, separating the solid phase and recovering said absorbed substance therefrom.

18. The process of claim 17 in which said rubber is pre-treated with the liquid selected from the group consisting of oil and oil-miscible liquids.

19. The process of claim 17 in which said substance is contacted with said rubber simultaneously with the liquid selected from the group consisting of oil and oil-miscible liquids.

JAN BOLDINGH.

REFERENCES CITED

The following references are of record in the file of this patent:

UNITED STATES PATENTS

| Number | Name | Date |
|---|---|---|
| 150,303 | Dieterichs | Apr. 28, 1874 |
| 2,082,304 | Stam | June 1, 1937 |
| 2,174,177 | Kraybill et al. | Sept. 26, 1939 |
| 2,255,875 | Buxton et al. | Sept. 16, 1941 |
| 2,341,329 | Myers | Feb. 8, 1944 |
| 2,367,803 | Schindler | Jan. 23, 1945 |

FOREIGN PATENTS

| Number | Country | Date |
|---|---|---|
| 258,786 | Great Britain | Sept. 30, 1926 |